US008984275B2

(12) United States Patent
Ozgit

(10) Patent No.: US 8,984,275 B2
(45) Date of Patent: Mar. 17, 2015

(54) VIRTUAL AIR GAP—VAG SYSTEM

(75) Inventor: Attila Ozgit, Ankara (TR)

(73) Assignee: Attila Ozgit, Ankara (TR)

( * ) Notice: Subject to any disclaimer, the term of this patent is extended or adjusted under 35 U.S.C. 154(b) by 630 days.

(21) Appl. No.: 12/747,718

(22) PCT Filed: Aug. 15, 2008

(86) PCT No.: PCT/TR2008/000099
§ 371 (c)(1),
(2), (4) Date: Aug. 31, 2010

(87) PCT Pub. No.: WO2009/075656
PCT Pub. Date: Jun. 18, 2009

(65) Prior Publication Data
US 2010/0318785 A1 Dec. 16, 2010

(30) Foreign Application Priority Data
Dec. 13, 2007 (TR) .............................. A 2007/08644

(51) Int. Cl.
H04L 29/06 (2006.01)
(52) U.S. Cl.
CPC ........ H04L 63/0209 (2013.01); H04L 63/1425 (2013.01)
USPC ....................................................... 713/154
(58) Field of Classification Search
USPC ................................ 726/22–25; 713/152–154
See application file for complete search history.

(56) References Cited

U.S. PATENT DOCUMENTS

| 6,584,508 | B1* | 6/2003 | Epstein et al. ................ 709/229 |
| 6,880,089 | B1* | 4/2005 | Bommareddy et al. ........ 726/11 |
| 6,968,459 | B1* | 11/2005 | Morgan et al. ................ 713/189 |
| 7,154,898 | B1* | 12/2006 | Pecus et al. .................... 370/401 |
| 7,424,736 | B2* | 9/2008 | Cook et al. ...................... 726/11 |
| 7,596,227 | B2* | 9/2009 | Illowsky et al. .............. 380/277 |
| 7,849,303 | B2* | 12/2010 | Miller ........................... 713/150 |
| 2002/0112185 | A1* | 8/2002 | Hodges ......................... 713/201 |
| 2002/0116501 | A1* | 8/2002 | Ho et al. ....................... 709/227 |
| 2003/0051026 | A1* | 3/2003 | Carter et al. ................... 709/224 |
| 2003/0051155 | A1* | 3/2003 | Martin .......................... 713/201 |
| 2003/0177387 | A1* | 9/2003 | Osterwalder et al. ......... 713/201 |
| 2007/0067837 | A1* | 3/2007 | Schuster ......................... 726/11 |
| 2009/0126002 | A1* | 5/2009 | Vail et al. ........................ 726/12 |

* cited by examiner

*Primary Examiner* — David Le
(74) *Attorney, Agent, or Firm* — Gokalp Bayramoglu

(57) ABSTRACT

This invention consists of a virtual air gap—VAG system developed in order to provide Internet and computer security. The virtual air gap system developed in this invention is characterized by the principal elements of: "Virtual air gap (14)," Internal security component (15), "External security component (16)," Message transfer mechanism of the system components positioned between internal and external security components (5, 6) and a shared memory (7), "Internal system (9) consisting of the internal security component and such other components (11) contained in the system, and connecting the same to the internal network (1)," External system (10) consisting of the external security component and such other components contained in the system, and connecting the same to the external network (2), and "Shared memory (7).

28 Claims, 5 Drawing Sheets

VIRTUAL AIR GAP—VAG SYSTEM

RELATED FIELD OF INVENTION

This invention is related to a virtual air gap-VAG system developed in order to provide Internet and computer security.

PRIOR ART

It is a known fact that there exists several technologies made use of, such as firewall, IDS, anti-virus, anti-spam, content filtering and many others, maintaining corporate as well as personal security on the Internet. All such technologies operate as systems interconnected via IP and such other Internet protocols. Whereas it is a well-known fact that those systems connected to the Internet via IP and other Internet protocols are consistently and widely open and prone to these well-known threats.

This invention on the other hand is isolating such systems of institutions utilizing IP and such other Internet protocols, but still enables continuation of real time communication. In due research carried out therefor, no system of the same structure, any other patent, useful model or application have been traced.

TECHNICAL PROBLEM AIMED TO BE RESOLVED AND TARGETED PURPOSES

Today, those organizations like banks, health institutions, security units, military units and such other public entities dealing with "task-critical" transactions also require to be connected to the Internet and carry out real time corporate interaction (real time data sharing and updating) over the Internet. It is possible for these institutions to be directly connected to the Internet via known technologies and realize their such interactions by means of IP and other relevant protocols. However, at present threats over the Internet are ever-increasing and such threats are encumbering the organizations realizing "task-critical" transactions over the Internet, even at times rendering the same impossible.

Virtual air gap system developed under this invention has been devised in order to protect those institutions connected on corporate status to the Internet and receiving/providing real time service over the Internet against current security threats as well as to eliminate such threats. The system, positioned between the external network (the Internet) (2) and the internal network (organizational net) (1), is not making use of IP based communication internally, and thereby a "virtual air gap" border is created between the two nets, enabling a high level of security.

Such characteristic of the system is providing the desired security solution with respect to secure connection to the Internet for such corporate networks carrying out (critical) tasks of high level of security.

EXPLANATION OF THE FIGURES

Those figures prepared for better explaining the virtual air gap system devised by this invention are presented attached hereto, and these are accordingly identified herebelow.

EXPLANATION OF THE ELEMENTS (FEATURES/COMPONENTS/PARTS) ON THE FIGURES

In order to explain better the virtual air gap system devised by this invention, components included on the figures and constituting relevant elements of the invention are individually numbered, and the identification of each number is given herebelow.
1—Internal Network
2—External Network
3—Virtual Air Gap Security Border
4—Virtual Air Gap (VAG) System
5—Internal Security Component
6—External Security Component
7—Shared Memory
8—Message Transfer Mechanism of System Components
   8.1—Outgoing Request Message
   8.2—Incoming Reply Message
   8.3—Incoming Request Message
   8.4—Outgoing Reply Message
9—Internal System
10—External System
11—Other Components Included in the System
   11.1—Customized Operating System
   11.2—Internal and External Security Wall
   11.3—Intrusion Detection
   11.4—Integrity Inspector
   11.5—Authenticity Data Placed on Internal and External Security Components
   11.6—CEM—Confidentiality and Encryption Module
   11.7—Audit/Log

DETAILED EXPLANATION OF THE INVENTION

Figure 1:
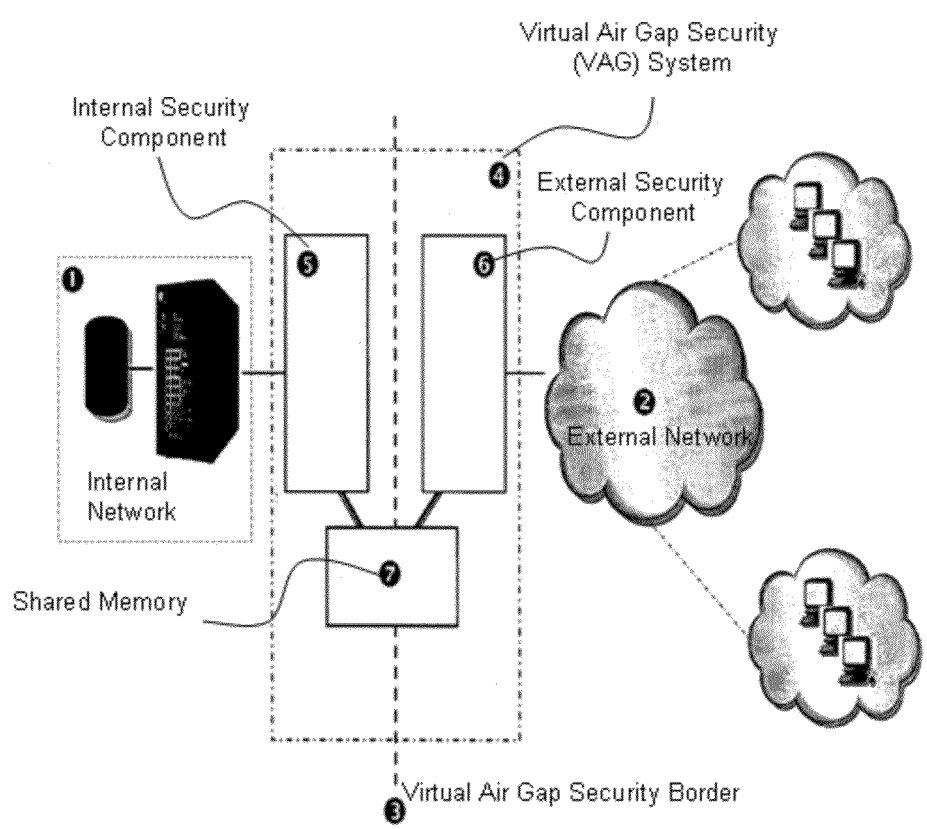
FIG. 1: Outlook on General System Architecture.

On FIG. 1 showing the overall architecture of the virtual air gap developed by this system, such structure of the Virtual Air Gap—VAG system (4) between a high-security level internal network (1) and the external network desired to be communicated with (2) is displayed. Said system is designed so as to enable data transfer without any IP based network connection, and basically consists of an internal security component (5), an external security component (6), and a shared memory component (7) to which the former two are connected.

Figure 2:
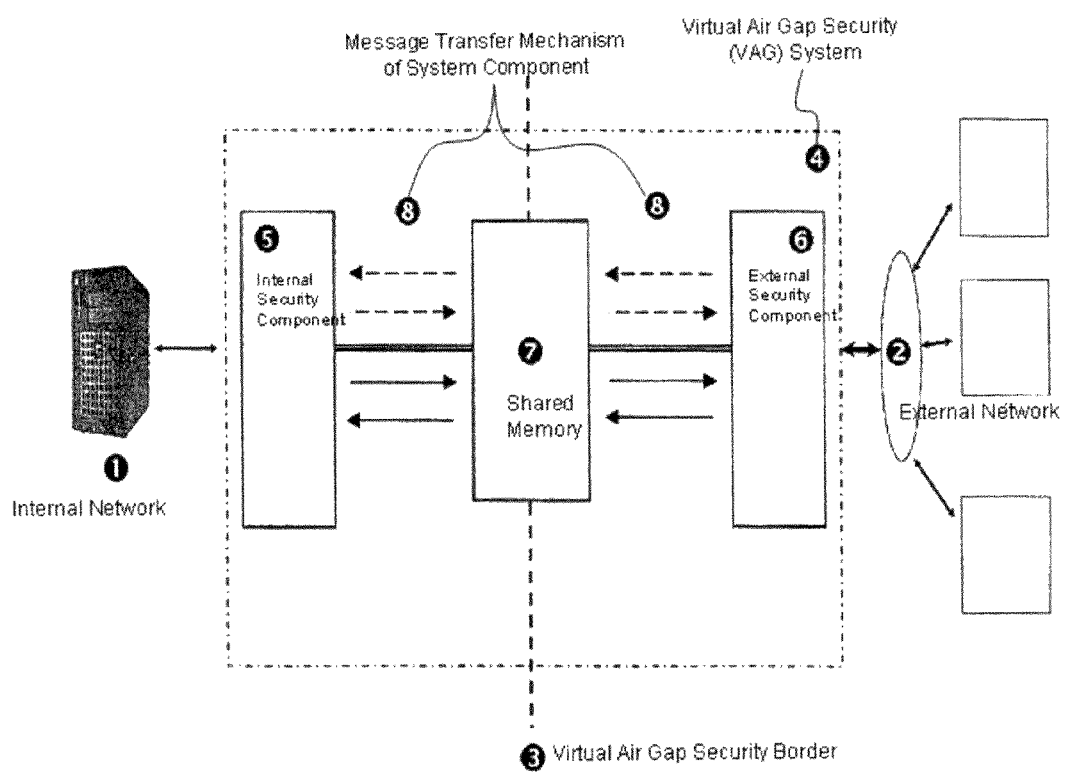
FIG. 2: Outlook on the Internal Functioning Mechanism of System Security Components

On FIG. 2 showing the internal functioning mechanism of the security components of such virtual air gap system devised through this invention, it has been displayed that the sole and unique type of communication realized between the external and internal security components (6 and 5) is specially coded and encrypted message communication (8) conveyed in both directions by means of reading/writing transactions from/to the shared memory (7).

Figure 3:
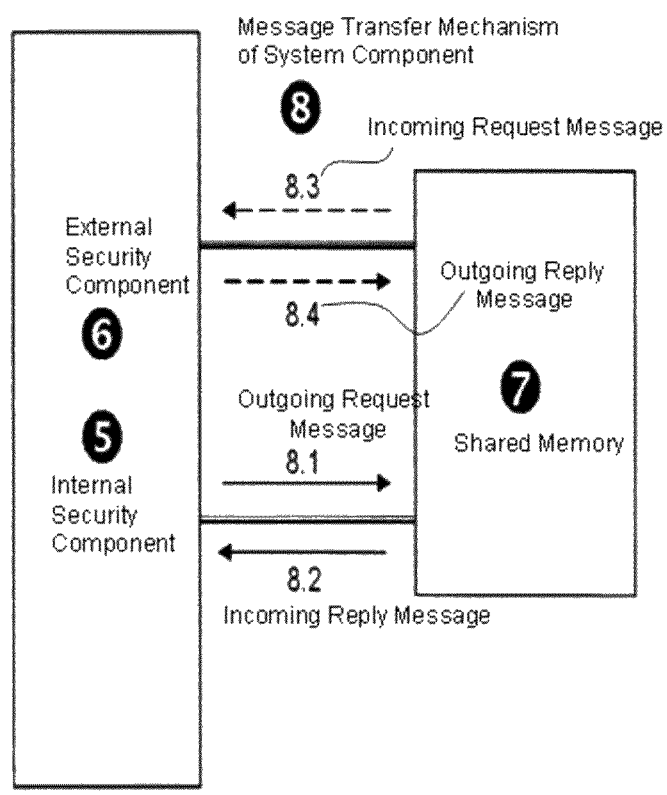
FIG. 3: Outlook on Message Transfer Mechanism of System Components.

On FIG. 3 depicting the message transfer mechanism of the system components, the mechanism of message conveyance (8.1-8.4) carried out between internal and external security components (6 and 5) is displayed.

Figure 4:
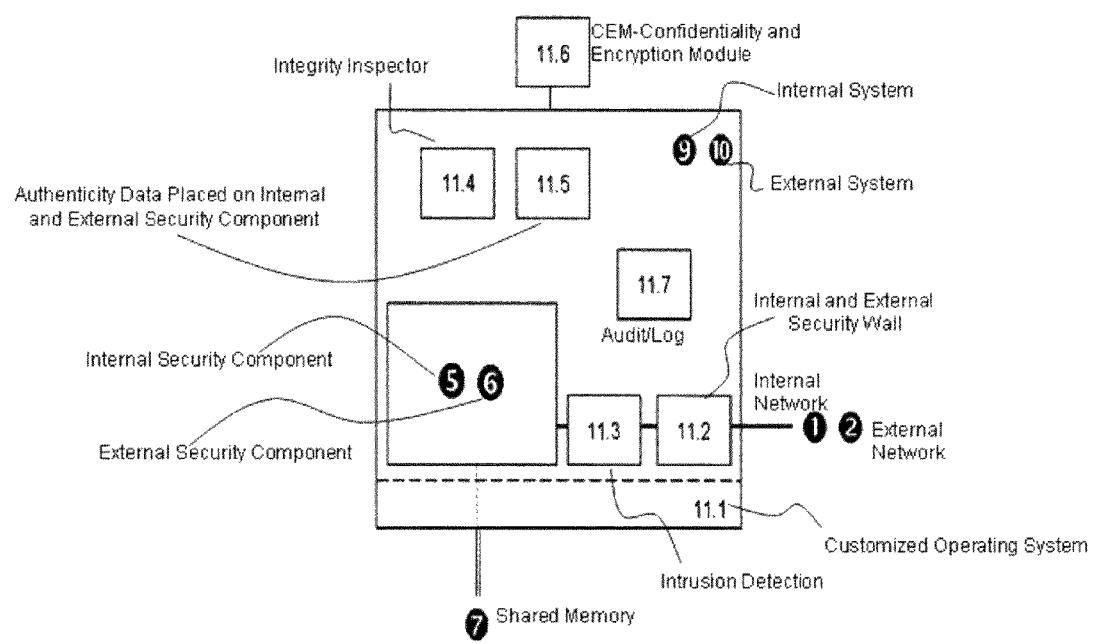
FIG. 4: Outlook on System's Internal Structure.

Internal structure and components of the system are displayed on FIG. 4.

Figure 5:
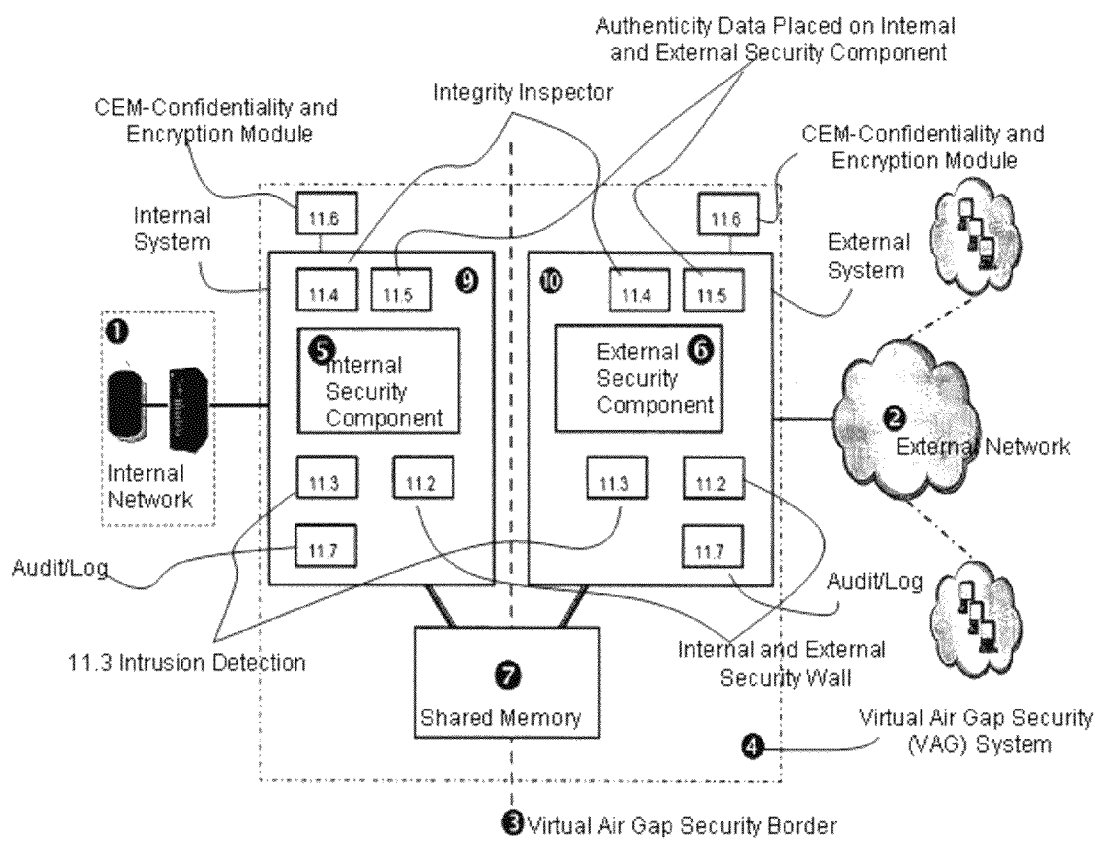
FIG. 5: Outlook onf System's General Structure in the Common Utilization.

On FIG. 5 showing the overall structure of the system in the field of general application, any and all components required for positioning of the system in typical real life and corporate environment applications, as well as for a sound operational ambient are displayed.

Basic Operational Structure of the System

Virtual Air Gap—VAG system developed through this invention (4), has been designed so as to function between an internal network of high security level (1) and such external network (2) desired to be provided data communication with, in such a manner as enabling data transfer without any IP based connection, meeting real time and two-way interaction requirements.

Virtual Air Gap—VAG system developed through this invention consists basically of internal (5) and external (6) security components and a shared memory component (7) to which these are connected.

In the Virtual Air Gap—VAG system developed through this invention, requests coming from the external network (2) are received by the "external security component" in the system (6) and are duly processed. The same are passed through a process operating at the external security component (6) for application level checks. Those requests passing from the control are transferred to the shared memory (7) after encryption and digital signing procedures. "Internal security component" (5) within the system takes such requests from the shared memory, and after decryption and signature check operations, audits the content of the request. In case no problem has been encountered in any of these stages, requests are recorded and transferred to the corporate application running on the internal network (1). All problems that might arise in any of the aforesaid stages are recorded; as such records can be used with the purpose of analyzing the security or functioning of the system, the same can also be transferred to external environments and saved in order to document the history of the whole interaction. In order to provide a further security before the external and internal security components (6 and 5) contained in the system, firewall and intrusion detection systems are also operated.

The sole and unique type of communication carried out between external and internal security components (6 and 5) is the specially encrypted message communication (8) conveyed to and from the common shared memory (7) in both directions by means of the encrypted reading/writing transactions. The most essential point of the system regarding security are such special structuring, encrypting, electronic signing and message formats used on the shared memory (7). Thereby, even where it is possible for the intruder to seize the external system (10), its access to the internal system (9) is avoided.

Pursuant to such other security measures to be adopted by the organization/entity concerned, it is also possible to nest on the external and internal networks (2 and 1), such other security technologies further to and in addition to the system devised by this invention. This neither prevents the designed system from operating, nor does positioning of the system on the corporate network create any problem with respect to such other security measures adopted by the institution.

General system architecture of the virtual air gap (VAG) system developed through this invention is displayed on FIG. 1.

Such virtual air gap system (4) situated between the internal network (1) to be protected and any external network (2) prone to intrusions, in order to establish a virtual air gap security interface, consists of the following principal elements:

The virtual air gap (VAG) system (4),
Internal Security Component (5),
External Security Component (6),
Message transfer mechanism (8) of system components located between the aforesaid internal and external security components (5 and 6), and the shared memory (7),
Internal system (9) consisting of the internal security component (5) and such other components (11) contained in the system,
External system (10) consisting of the external security component (6) and such other components (11) contained in the system, and
The shared memory (7).

Internal network (1) is the corporate internal network to be protected by the virtual air gap.

External network (2), is such external network (Internet)) to which the organization is connected by using the virtual air gap.

Virtual air gap security interface (3) is the intermittent line shown on FIG. 1 and is an indication that the virtual air gap is providing security as well as isolation.

Virtual Air Gap—VAG sytem (4); is such system in its entirety developed through this invention. It basically comprises of three sub-components, namely the internal security component (5), external security component (6), and the shared memory component (7).

Internal security component (5) is the component enabling secure connection of the system to the internal network (1).

External security component (6) is the component enabling secure connection of the system to the external network (2).

Shared Memory (7) is the shared memory field where the internal and external security components (5 and 6) of the system realize two-way message transfer.

Message transfer mechanism (8) of the system components is such mechanism encrypting into formats the requests forwarded by the internal security component (5) and the external security component (6) as well as the replies received in return, writing the same as embedded messages into the shared memory (7) and reading them.

Messages transferred through the message transfer mechanism (8) comprise of
Outgoing request message (8.1),
Incoming reply message (8.2),
Incoming request message (8.3), and
Outgoing reply message (8.4).

Outgoing request message (8.1), is the writing of the related security component
(5 or 6) such request coming from its interconnected network onto the shared memory (7) to convey the same to the other security component.

Incoming reply message (8.2), is reading from the shared memory (7) of the related security component (5 or 6) such reply coming from the other security component to convey the same to its interconnected network.

Incoming reply message (8.3), is reading from the shared memory (7) of the related security component (5 or 6) such request coming from the other security component to convey the same to its interconnected network.

Outgoing reply message (8.4), is the writing of the related security component (5 or 6) such reply coming from its interconnected network onto the shared memory (7) to convey the same to the other security component.

Internal system (9) is such system on which the internal security component (5) and other required components (11) operate, connected to the internal network (1).

External system (10) is such system on which the external security component (6) and other required components (11) operate, connected to the external network (2).

Such other components (11) required for maintaining the adequate security level on the internal and external systems (9 and 10) contained within the virtual air gap system developed by this invention consist of:

Customized operating system (11.1),

Internal as well as external firewall (11.2),

Intrusion detection (11.3),

Integrity auditor (11.4),

Authenticity data placed onto the internal and external security components (11.5), and Confidentiality and encryption module (11.6)

Audit/log elements (11.7)

Customized operating system (11.1); is an operating system core, running on the internal and external systems (9 and 10), duly customized and security level enhanced.

Internal and external firewall (11.2); is such element included in the system in order to audit, filter and record any harmful and irrelevant traffic that can possibly arrive through the interface of the related system upon utilization of the IP protocol.

Intrusion detection (11.3); is such network and system based intrusion detection element included in the system in order to prevent and record possible intrusions that can nest in the network traffic passing through the internal and external firewalls (11.2) and reach the system.

Integrity auditor (11.4); is an integrity auditing element checking any and all unauthorized alterations on the entire critical files and folders contained in the system.

Authenticity data (11.5) placed on internal and external firewalls, are such encrypted data evidencing non-disturbance of their authenticity, with the purpose of protecting such internal and external security components (5 and 6).

Confidentiality and encryption module (11.6); is a security component where the password, password couple, and such similar data required for the encryption transaction carried out on the internal and external security components (5 and 6) are saved.

Audit/Log component (11.7) is the element where data with respect to the transactions carried out at internal and external security components (5 and 6) are compiled for assessment, together with data regarding times pertaining thereto.

Secure Message Exchange

Basic design characteristic of the virtual air gap devised through this invention is ensuring that there exists no direct connection at the IP level between the internal network of the institution (1), and such external network (2) the same is to be connected to. This is an essential feature that shall disable a substantial number of probable and known intrusions. As well as and besides this basic feature, further security precautions have been taken at various other levels of the system. Primarily, connections arriving from the external network (2) are required to pass through all levels like VPN, Firewall, IDS and XML firewall. Any intrusions to occur at any one or several of these levels due to security deficiencies are prevented at the remaining lower levels.

Those requests successfully received by the external security component (6), duly processed and written onto the shared memory (7) by means of special patterns, as well as the replies arriving from the internal security component (5) and written onto the shared memory (7) by making use of the same methods, are encrypted and electronically signed, saved in a manner not compatible with standard file systems. Whereas access to the shared memory (7) located between those two components is only via the relevant (internal or external) security component (5 and 6).

Even in the event access is provided to the internal or external security component (5 and 6), the intruder is primarily required to decrypt the special formats of the requests and replies passing through the shared memory, and then decrypt the same. Besides, Standard file systems (EXT3, FAT, NTFS, etc.) are not being used in accessing the shared memory (7). Therefore, even when access to the shared memory (7) is succeeded by the intruder, as requests and replies thereto are formatted and encrypted on a specially designed file system, it shall encounter a hardship proportional to the power of the encryption algorithm, and in addition to this, be faced with a further difficulty directly proprtional with the hardship in relation to not being acquainted with the structure of the file system, and shall not possibly have any access to the message contents. In fact, as the system shall be operating on real time basis, it is also not possible for any intruder to nest unrecognized on this system for such a span of time as to perform the said operations.

Whereas in addition to the measures aforesaid, the internal security component (5) is carrying out audits on the incoming requests, and is registering the same so as to be saved as daily log records. By expanding scope of such extra audits, measures can possibly be taken against any security deficiencies that might arise at the application level. In the event of any possible intrusion, reviewing and analyzing the logs kept by the system would facilitate revealing the source of such an intrusion.

User Access

In the virtual air gap system developed through this invention, auditing access demands of external clients are realized over the external security component (6). At this stage the client is subjected to several security measures. Such measures can be listed as the client having properly identified itself, entered a specific VPN net, or the IP address being a valid one, the client being enabled access only by means of the relevant protocol (for instance, HTTPS/port 443), its duly passing through the user verification of the system by means of a client digital certificate and/or user name/password to be audited by the application, all traffic arriving from the client be properly stopped and filtered initially by firewall, intrusion detection and application level (for example, XML) audit systems.

After the data segments of the requests coming to the system are duly passed through the corresponding protocol inspections, message authentication and queuing processes are effected on the messages transmitted. In this way, it is ensured of the identity of the person sending the message and that there has been made no modification on the message. Those procedures carried out on the external security component are duplicated by their equivalents on the internal security component, thereby generating an additional security layer, and even in the event of capture of the external security component, security of the internal network is assured upon extra security checks performed by the internal security component.

Basic Operations

Basic operations to be performed by the system consist of encrypting the data segments of the messages arriving at the external security component and having successfully passed from the access control and authentication procedures, hence writing the same onto the shared memory by means of special formats, and after reading these messages via the internal security component, decrypting the same and passing through equivalent duplicate audits, sending them to the relevant security components on the internal network. In the process of encryption, Confidentiality and Encryption Module (CEM) contained in the security components is made use of.

As security of the system at this point shall be limited to the securities involved with the methods and algorithms used by the CEMs, devising of a physical environment and related physical security measures whereby security of physical access to the CEMs as well as access to such special keys and other confidential data contained therein is restricted at such a level as to provide adequate security is anticipated.

Following basic security functions are contained on the internal and external security systems on which basic operations are carried out by internal and external security components (5 and 6):

Identity authentication and heartbeat message exchange between external and internal security components over the shared memory By means of this feature, in case live communication is disturbed, a real time "alarm" is generated and thus it is instantly and easily understood that there exists an abnormal situation on the system.

Authenticity data placed on the internal and external security component

By means of this feature, capture of the internal and/or external security component by any probable intruder is avoided.

Special message queuing protocol between the external and internal security component By means of this dynamic feature, the level of mutual confidence between the external and internal security components is enhanced, and thereby the detection of abnormality is facilitated, hence the level of security is upgraded.

Audit/Logging

Upon encrypting the messages passing over the system, logging records are kept, and whenever deemed necessary, such records are reviewed to monitor the accesses to the system, as well as those requests and replies passing through. Logging records are kept also for such messages disabled by the controls made at any level of the system, and whenever any need arises therefor, security analyses of the system and identification of possible intrusions are provided for.

System Integrity

System integrity has two main components: (i) integrity of the operating system, (ii) integrity of the transmittal and saving pocesses of the messages conveyed by the system.

a) By means of regularly running the security software providing for the operating system and filing system integrity on the external and internal security components making up the system, overall integrity of the system is audited.

b) Upon regular analyses of the log records kept, probable intrusions (successful or otherwise) are possibly revealed. And by means of such statistical analyses made on these log data, abnormal incidents can possibly be detected.

c) Whereas the integrity of messages conveyed through the system is audited by means of message authentication procedures.

Other Characteristics

Transactions regarding receival of the messages conveyed over the shared memory by the related security component and transfer of the same to the related network can possibly be carried out at the desired speed. In suspectful circumstances to arise in the system, it is possible to slow down or even stop the message traffic intentionally and in a controlled manner.

Log records kept by the system can contain information regarding internal functioning or about contents of any message requiring reporting of the same. Although such information are required to identify such incidents in the system with respect to security, in order to maintain confidentiality of message traffic, these are kept secret and can only be decrypted by using an authorized password.

Application Of The Invention To The Industry

The system has been designed in order to stand against security threats present for organizations connected to the Internet, receiving from as well as providing service from the Internet on real time basis, as well as to eliminate such threats. The system positioned between the external network and the corporate network (internal network), is not making use of IP based communication, and thereby constituting an "air gap" between the two networks. Such feature is providing the solution desired for corporate networks performing tasks of high security (critical) level.

The invention claimed is:

1. A virtual air gap system comprising:
an internal security component;
an external security component;
the internal security component and the external security component are positioned between an internal network and an external network;
a shared memory that is directly connected to the internal security component; wherein the shared memory is also directly connected to the external security component;
a message transfer mechanism positioned between the internal security component and the external security component and the shared memory;
wherein an incoming or outgoing message from the external or internal security component is encrypted, digitally signed and written into the shared memory;
wherein the incoming message in the shared memory is decrypted, digital signature is checked and verified, and an outgoing message is produced wherein the outgoinq message is substantially similar to the incoming message;
the system further comprises: an outgoing request message; an incoming reply message; an incoming request message; and an outgoing reply message; wherein the outgoinq request messaqe, the incoming reply message, the incoming request message and the outgoing reply messaqe are handled by the corresponding external security component or the corresponding internal security component;
wherein an incoming or outgoing message from the external or internal security component is encrypted, digitally signed and written in a manner not compatible with standard well-known file systems such that even if an intruder can access to the shared memory, the intruder cannot decrypt the incoming or outdoing message in the shared memory.

2. The virtual air gap system of claim 1, wherein the incoming reply message being read from the shared memory by the internal security component when that reply is written by the external security component.

3. The virtual air gap system of claim 1 wherein the incoming request message being read from the shared memory by the internal security component when that request is written by the external security component.

4. The virtual air gap system of claim 1 wherein the outgoing reply message being read from the shared memory by the external security component when that reply is written by the internal security component.

5. The virtual air gap system of claim 1 further comprising: a customized operating system; an internal firewall element; an external firewall element; an intrusion detection element; an integrity auditing element; a plurality of authenticity data; a time audit placed on the internal security component; the time audit also placed on the external security component; a confidentiality and encryption/decryption module and an audit/log element for keeping audit/log records.

6. The virtual air gap system of claim 5 wherein the internal firewall element and the external firewall element provide auditing, filtering and recording of any harmful and irrelevant traffic that can arrive through the network interface of the system upon utilization of an IP protocol.

7. The virtual air gap system of claim 5 further comprising an intrusion detection mechanism wherein the intrusion detection mechanism being a network and a system based element preventing and recording possible intrusions that can nest on the network traffic passing through the internal firewall element and the external firewall element before reaching the system.

8. The virtual air gap system of claim 5 wherein the integrity auditing element is used for monitoring unauthorized alterations made on a single or a plurality of critical files and folders in the system.

9. The virtual air gap system of claim 5 wherein the authenticity data placed on the internal security component and the external security component encrypted and digitally signed so as to form evidence that its authenticity is not disturbed.

10. The virtual air gap system of claim 5 wherein the internal security component and the external security component further comprising a software security module wherein a key, a key pair, and a plurality of data required for encryption, decryption, signing and signature verification transactions are saved for performing these transactions.

11. The virtual air gap system of claim 5 wherein requests received by the external security component is processed and written onto the shared memory by using a special format and by using a plurality of replies received from the internal security component and written onto the shared memory using the special format and encrypted and electronically signed and saved in a manner not compatible with standard file systems.

12. The virtual air gap system of claim 5 wherein requests received by the internal security component, processed, and written onto the shared memory by means of special formats as well as requests coming from the external security component and written onto the shared memory by means of the same methods, are encrypted and electronically signed, and saved in a manner not compatible with standard file systems.

13. The virtual air gap system of claim 5 wherein a read or write access to the shared memory positioned in between the internal security component and the external security component, is accomplished by corresponding internal security component or by corresponding external security component.

14. The virtual air gap system of claim 5 wherein the audit/log component used for auditing the integrity of the messages processed by the system by using a message authentication procedure.

15. The virtual air gap system of claim 5 wherein the shared memory is accessed by using a customized/proprietary file system instead of a standard well-known file system which is selected from a group consisting of EXT3, FAT and NTFS.

16. The virtual air gap system of claim 5 wherein the internal security component used to carry out audits register those requests on the incoming requests.

17. The virtual air gap system of claim 5 wherein detection of possible intrusions is achieved by analyzing the log records and performing statistical analysis on said records to detect abnormal conditions.

18. The virtual air gap system of claim 5 wherein the log records are encrypted for storage and decrypted when needed by using authorized key.

19. The virtual air gap system of claim 5 wherein the logs are reviewed and analyzed for determining if an intrusion has occurred and the source of the intrusion.

20. The virtual air gap system of claim 5 wherein the access to the system is monitored by analyzing the log records whereas the log records are generated by encrypted messages passing through the internal security unit and the external security unit, and those messages not able to pass controls at any level of the system are further kept as log records, and making security analysis of the system as well as identification of possible intrusions.

21. The virtual air gap system of claim 5 further comprising the steps of:
   the client identifying itself and having entered a specific VPN net or its IP address being a valid one; the client being enabled to access only by means of the related communication protocol; client digital certificate audited by the application to be protected and/or the user name, password passing through the user authentication of the system; all traffic coming from the client is stopped and filtered initially by firewall, IDS and XML audit systems.

22. The virtual air gap system of claim 5 basic security functions on the internal security module and external security module performed by the step of:
   identity authentication and heartbeat message conveyed over shared memory
   between the external security component and the internal security component;
   authenticating data placed on the internal component and the external security component; special queuing protocol between the external security component and the internal security component.

23. The virtual air gap system of claim 5 wherein the integrity audit feature comprising the operating system and the integrity of the transmittal and saving processed of the messages conveyed by the system.

24. The virtual air gap system of claim 5 wherein integrity of the operating system and the integrity of the file system created by the external security component and the internal security component.

25. The virtual air gap system of claim 5 wherein in the event of a suspicious activity on the system the flow of the message is slowed or stopped.

26. A method for providing a secure message exchange in the virtual air gap system of claim 1, the method comprising:
   receiving a message, a request or a reply by the internal or external security component;
   encrypting the message;
   electronically signing the message; and
   writing the message into the shared memory in a manner not compatible with standard file systems.

27. The method of claim 26 further comprising:
   reading the message from the shared memory;
   decrypting the message; and
   verifying the electronic signature of the message; and
   generating the message for destination as a result of these steps, such that the generated message is substantially similar to the received message.

28. The virtual air gap system of claim 1 wherein the outgoing request message being read from the shared memory by the external security component when that request is written by the internal security component.

* * * * *